PIETRO SADA
INVENTOR.

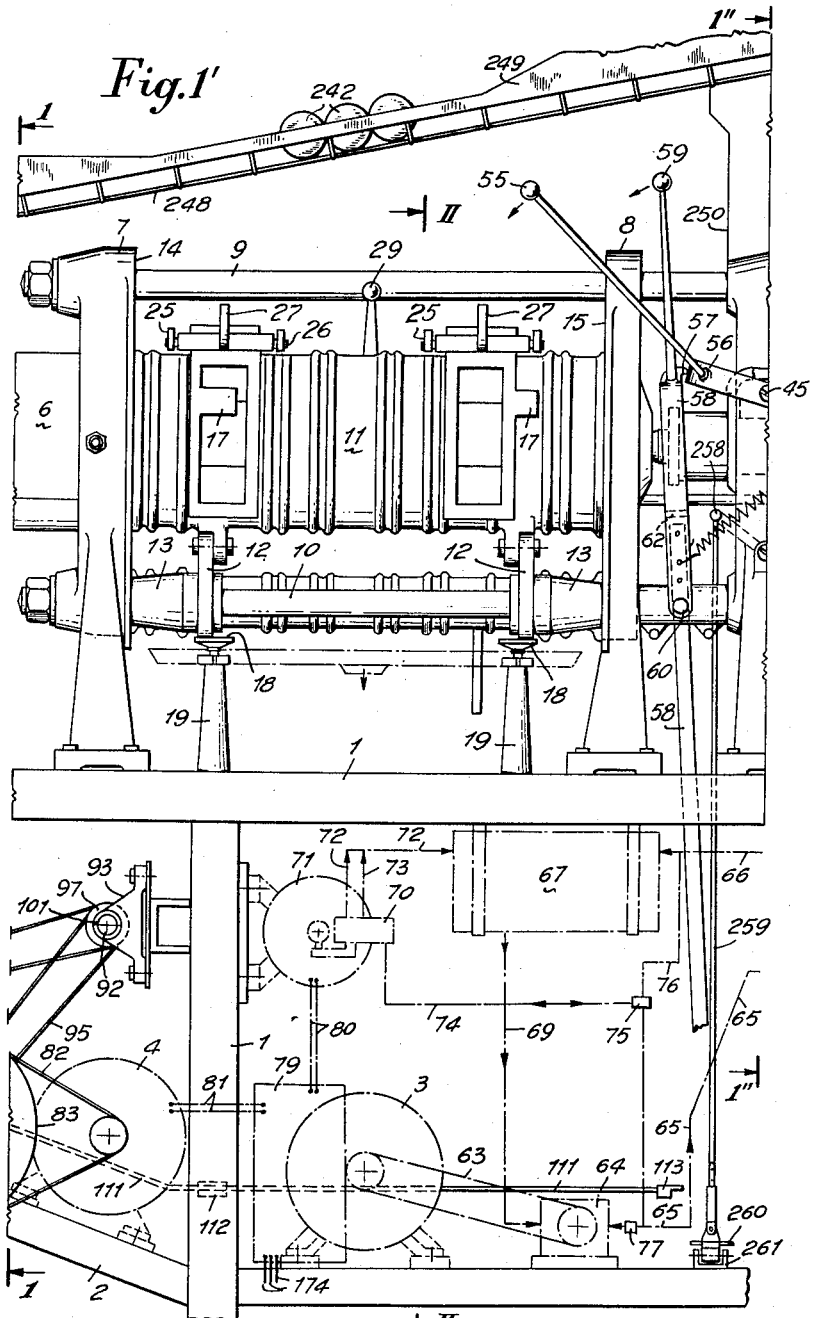

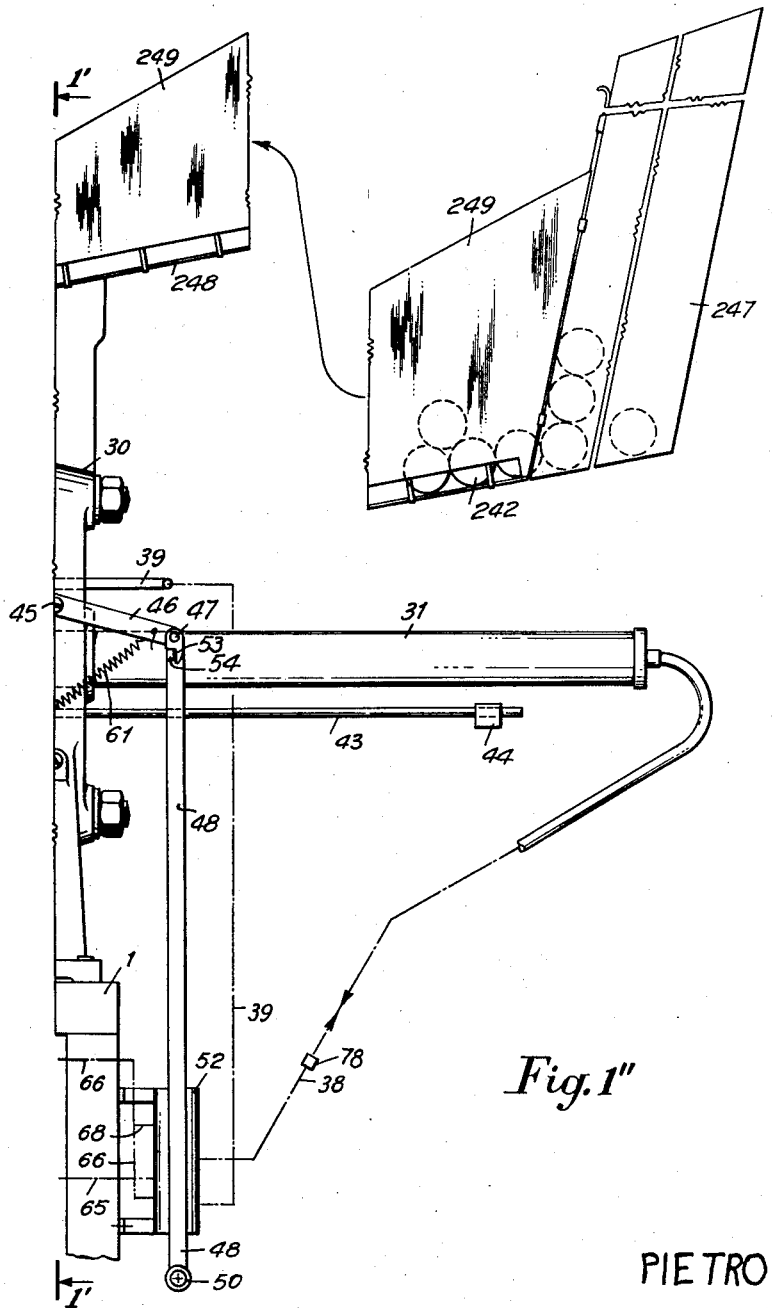
*Fig. 1"*
PIETRO SADA
INVENTOR.

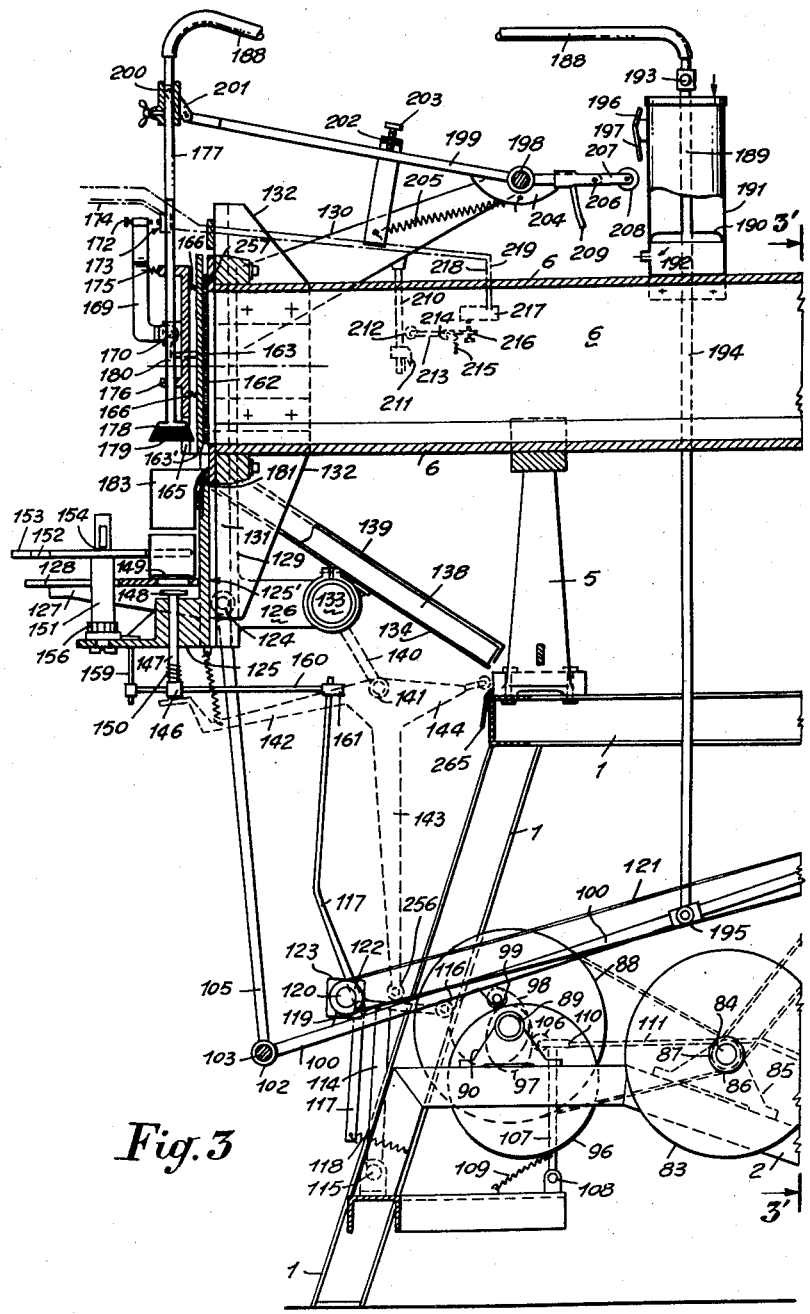

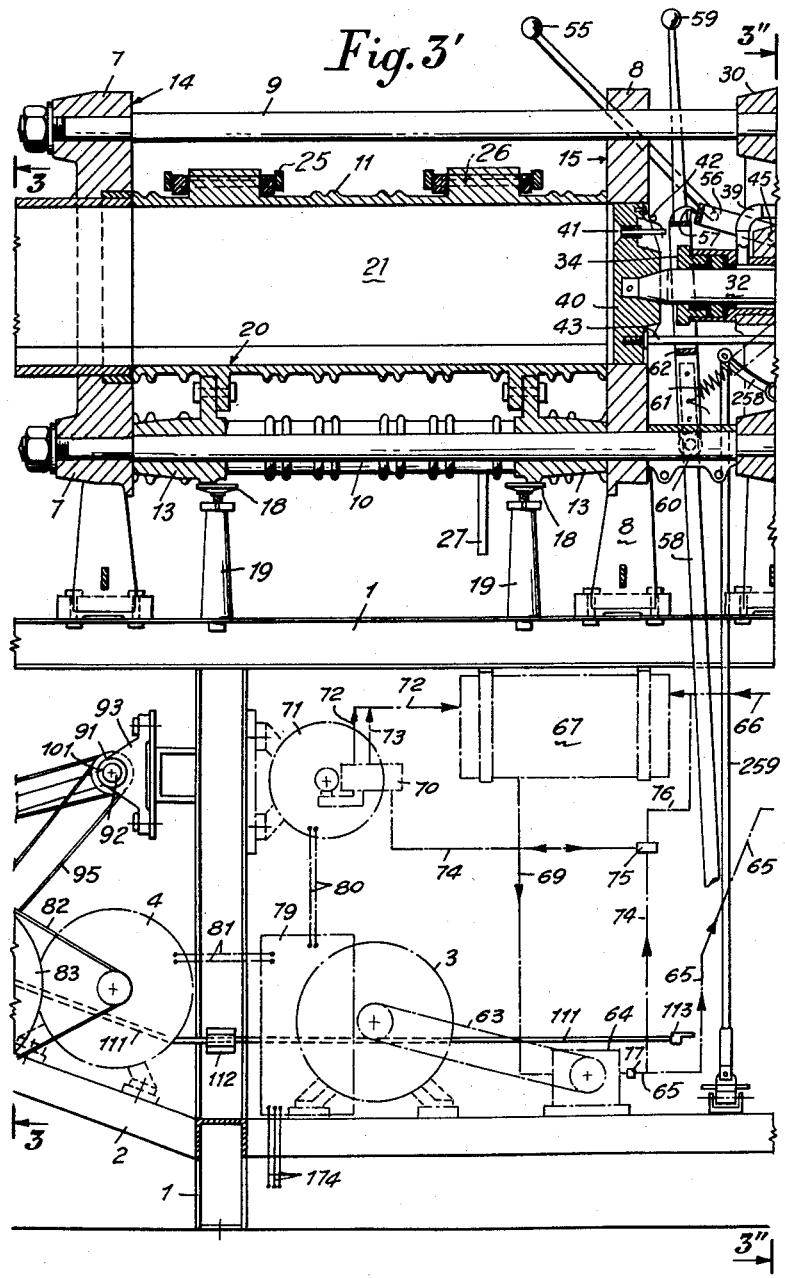

Fig.3″

PIETRO SADA
INVENTOR.

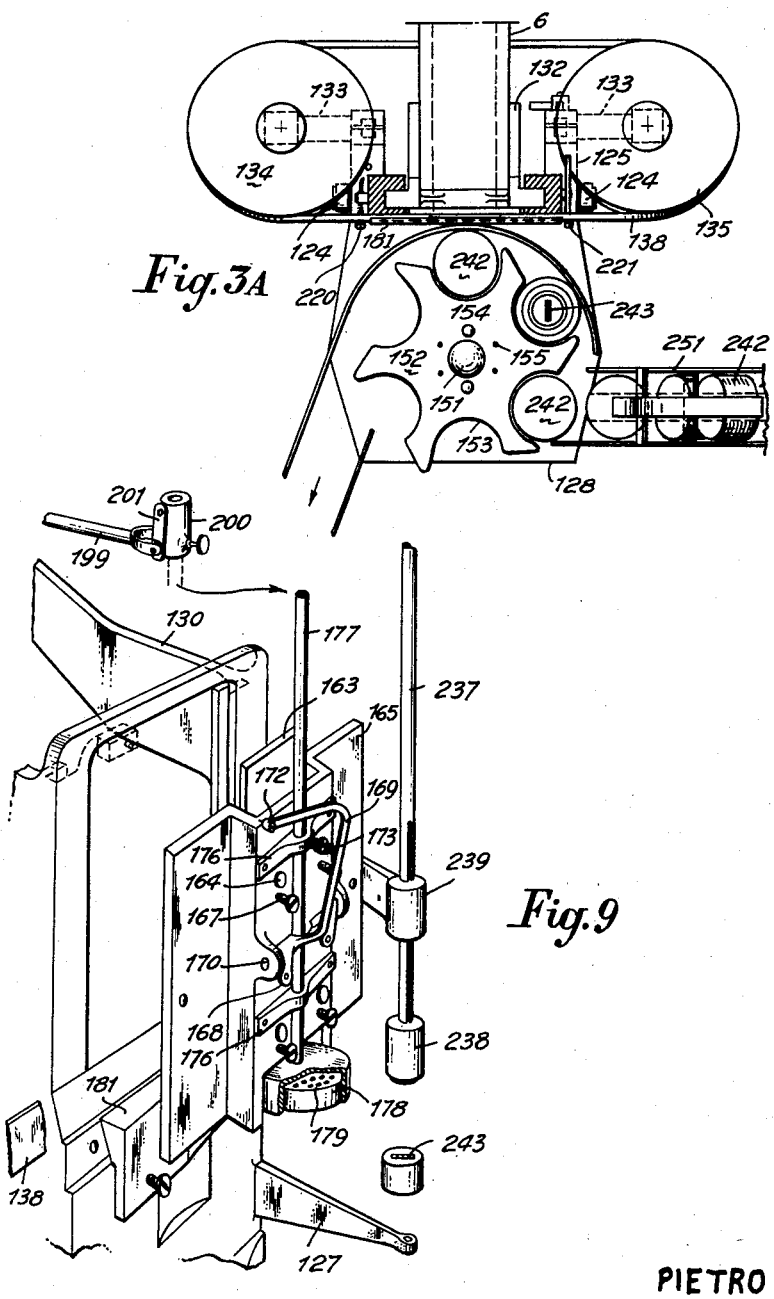

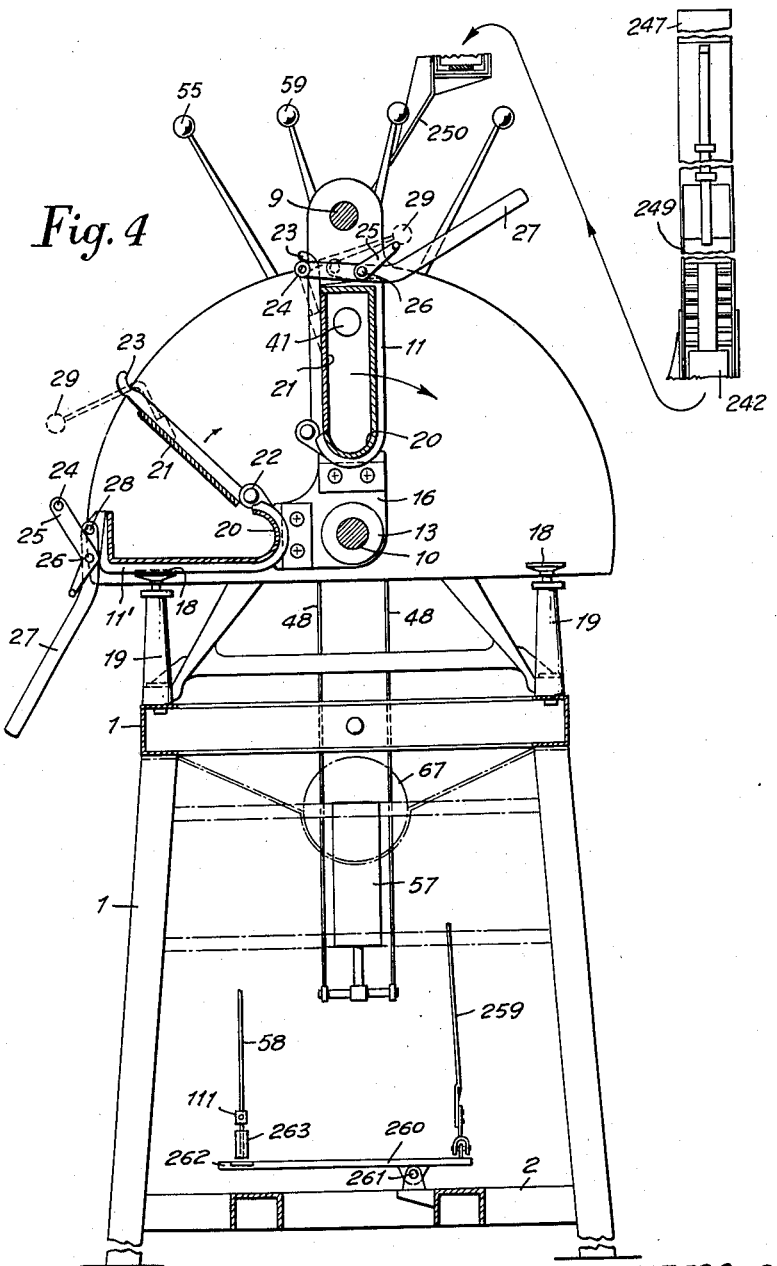

Nov. 10, 1959 P. SADA 2,911,776
MACHINE FOR SLICING AND CANNING FOOD PRODUCTS
AT PLASTIC STATE, PARTICULARLY MEAT
Filed Nov. 12, 1957 14 Sheets-Sheet 11

PIETRO SADA
INVENTOR.

BY Wenderoth, Lind & Ponack
Attys

PIETRO SADA
INVENTOR.

Nov. 10, 1959  P. SADA  2,911,776
MACHINE FOR SLICING AND CANNING FOOD PRODUCTS
AT PLASTIC STATE, PARTICULARLY MEAT
Filed Nov. 12, 1957  14 Sheets-Sheet 14
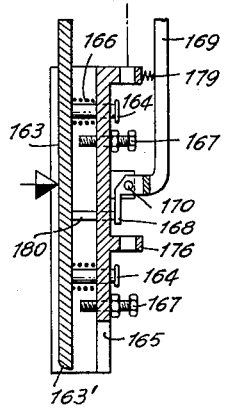
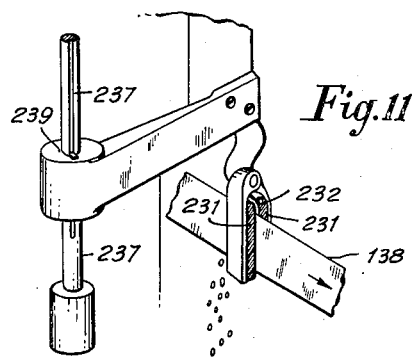
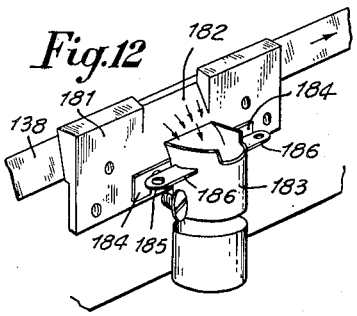
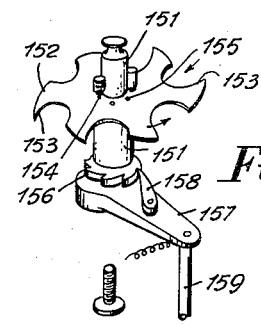
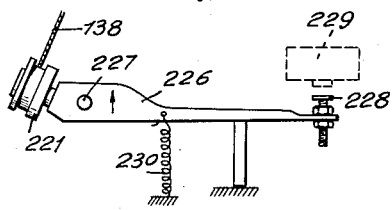
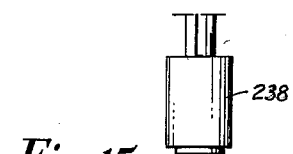
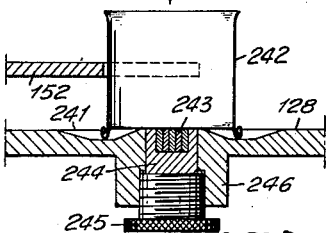
PIETRO SADA
INVENTOR.
BY Wenderoth, Lind & Ponack
Attys

United States Patent Office 2,911,776
Patented Nov. 10, 1959

2,911,776
MACHINE FOR SLICING AND CANNING FOOD PRODUCTS AT PLASTIC STATE, PARTICULARLY MEAT

Pietro Sada, Rome, Italy

Application November 12, 1957, Serial No. 695,615

Claims priority, application Italy May 29, 1957

12 Claims. (Cl. 53—63)

The present invention relates to the preservation art, and more particularly the object of this invention is a machine for slicing and canning food products which are in a plastic state, particularly meat.

The purpose of this invention is to provide an apparatus suitable for automatically performing a can filling operation under the best hygienic conditions, and at a remarkable rate of speed and with a uniformity of the canned product.

According to this invention, a machine is provided, which comprises in combination: a reservoir which is periodically loaded with the product to be canned, means to compress said product within said reservoir and to deliver sequentially from said reservoir a pre-established amount of said product through an outlet, means to slice said pre-established amount of the product and to convey said amount into a can, means to arrange the product within the can, and means to sequentially supply said cans to the filling station from a supply reservoir, means to apply a mark to the cans and finally means to eject the cans when the operations are ended.

This invention will be described with reference to the attached drawings, showing by way of example a preferred form of this invention when applied to meat canning.

In the drawings:

Figs. 1, 1' and 1" are a side elevational view of the machine according to this invention;

Fig. 2 is a front view of the machine of Fig. 1;

Figs. 3, 3', and 3" show a cross-sectional view taken along the line I—I of Fig. 2;

Fig. 3A is a diagrammatical plan view of the movable head;

Fig. 4 is a cross-sectional view taken along the line II—II of Fig. 1';

Fig. 9 is an exploded isometric view of the spacer plates of the movable head of the machine, with some elements removed for greater clarity;

Fig. 10 is a diagrammatical cross-sectional view of Fig. 9 taken along a vertical plane;

Fig. 11 shows a detail of the cleaning scraper of the continuous blade;

Fig. 12 is a detail of the mouth piece;

Fig. 13 is an isometric view of the feeding indexing fixture for the cans;

Fig. 14 shows a detail of an automatic stop control for the machine;

Fig. 15 shows a detail of the punching device.

Figure 1:
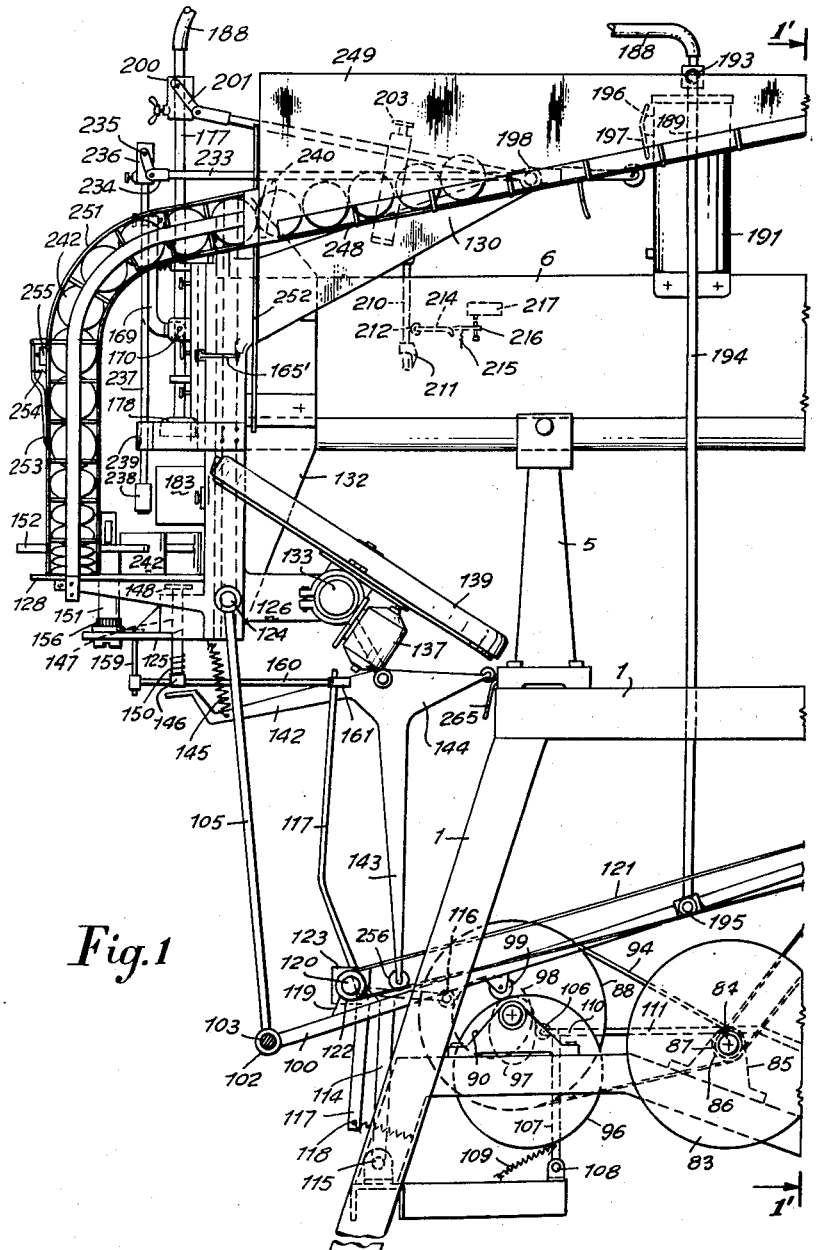

With reference to Figs. 1, 1' and 1", the machine is supported by a frame 1, on the base of which are mounted two electric motors 3 and 4 which actuate the movable members of the machine, apart from the continuous blade which will be described later.

The posts 5 of the frame 1, support an internally hollow reservoir 6, having a horizontal axis and a substantially parallelepiped shape. Said reservoir will hereinafter be termed the "gun." Extending from the gun and co-axially therewith, between the brackets 7 and 8 connected by the rods 9 and 10, a second reservoir is arranged, which will hereinafter be termed the "loading receptacle" and which is generally denoted by 11. The loading receptacle is provided with two arms 12 which are fixed to the sleeves 13 rotatably mounted on the rod 10. Thus, the entire loading receptacle 11 comprised between the vertical planes 14 and 15 is able to rotate about the rod 10 as shown by the arrows of Fig. 4.

A second loading receptacle 11' is positioned at right angles to the first cited receptacle 11, and is connected thereto by the angle brackets 16 also fixed on the sleeves 13 (Fig. 4).

Thus, the unit comprised of these two receptacles 11 and 11' forms a movable turret rotatable about the rod 10. When one of the receptacles is exactly axially registering with the gun 6, the other receptacle has its rest blocks 17 resting on the screw supported small platforms 18 mounted on the posts 19 carried by the frame 1. The adjustment of the platforms 18 serves to determine the exact registering of the loading receptacles' bores with the gun bore. The loading receptacles are filled with boiled meat in pieces of different sizes. This operation is carried out manually, taking care to position the best pieces along the concave wall 20 of the receptacle, since when the canning operation has been carried out, said choice meat will be in contact with the cover of the can which carries the sentence "side to be open," and will favorably impress the consumer.

So that it can be loaded (Fig. 4), each receptacle is provided with a seal cover 21 pivoted on the hinges 22 and provided with the seat 23 wherein is engaged the stud 24 carried by a lever 25 pivoted at 26 on the handle 27 which, in turn, is pivoted at the point 28 on the receptacle. The handle 27 operates to close cover 21, while a second handle 29 controls the rotation of said cover about the hinges 22.

The rotational movement of the loading receptacles 11 and 11' about the axis 10 is carried out manually, or a treadle operated control, for instance of the hydraulic type, may be provided to carry out this rotational movement, when desired.

The rods 9 and 10 (see also Fig. 3') are anchored at their rear ends to a third standard 30 to which is fastened the cylinder 31 co-axial with the gun 6 and with the receptacle 11. Inside the cylinder 31 is mounted the thrust rod 32 which is surrounded by the annular chamber 33 having at its fore end a sealing cap 34 and at its rear end a piston 35 carried by the rod 32 sealingly slidable within the cylinder 31. The bottom 36 of said cylinder 31 and the piston 35 define a chamber 37 communicating with the pipe 38 wherein flows a hydraulic fluid. Another pipe 39 leads to the annular chamber 33 around the thrust rod 32. The latter at its fore end is provided with the piston 40 slidable in sealing relationship within the loading receptacle 11 with a stroke substantially equal to the length of said receptacle. When the piston 40 is at the initial point of its stroke, it occupies the position of Fig. 3', i.e. it is exactly located within a seat provided in the standard 8 in order to allow the tilting movement of the receptacle 11 and its filling.

In the upper part of the piston 40 a poppet valve 41 is provided, biased toward its seat by a spring 42. Said valve permits air to enter the inner space of the loading receptacle 11 during the rearwards movement of the piston 40 to avoid creation of any vacuum downstream of said piston. Parallel to the cylinder 31 a rod 43 is fastened at one end to the piston 40, and at its other end said rod 43 carries a block 44 adjustably fastened thereto.

At the point 45 of the standard 30 is pivoted the rocker 46 pivotally connected to the rod 48, the lower end 49 of which is mounted by means of the pin 50 on the shank 51 connected to an hydraulic valve 52. To said valve are connected the pipes 38 and 39. In register with the pivot 47, the rocker 46 is provided with an ear 53 which rests against a stop 54 carried by the rod 48 and having the function of limiting the swinging movement of said rocker 46 in its clockwise direction. At the front end of the rocker 46 is fastened the control lever 55, which, when lowered causes the stud 56 carried by the rocker to engage the tooth 57 carried by the rod 58 controlled by the lever 59 and pivoted at point 60. Between the rod 58 and the rocker 46 a spring 61 is mounted with its ends anchored to the rod 58 above the pivot 60 and to the rocker 46 near to the pivot 47, respectively. The rod 58 at a point just under the rod 43 is provided with a stud 62.

The electric motor 3 operates through the drive 63 the hydraulic pump 64 from which originates the pipe 65 leading to the valve 52. From the latter, a pipe 66 opens into a reservoir 67 fastened to the frame 1 of the machine, the reservoir containing the hydraulic fluid. A further branched duct 68 connects the valve 52 to the pipe 66. Another pipe 69 carries the fluid from the reservoir 67 to the pump 64.

A second hydraulic valve 70, controlled by the servomechanism 71 is provided with the pipes 72 and 73 extending to the reservoir 67. The fluid is supplied to the valve 70 through the pipe 74 connected to the outlet 65 of the pump 64 with the interposition of the branch 75 having a branch pipe 76 which connects to the pipe 66. The hydraulic circuit is completed by the valves 77 and 78, being a safety valve and a check valve respectively, arranged in the delivery pipe 65 and in the pipe 38. The flow direction in the different pipes is that shown by the arrows of Fig. 3'.

The energization of the servomotor 71 is controlled by the remote control switch 79 to which said servomotor is connected by the leads 80. The leads 81, in turn connect the remote control switch 79 to the electric motor 4. The latter, by means of the belt 82, drives the speed reducing pulley 83 fixed to the shaft 84 which is journaled in the brackets 85 fastened to the base 2. The pulleys 86 and 87 are mounted on said shaft 84, and said pulleys drive the speed reducing pulley 88 fastened to the shaft 89 mounted on the supports 90 (see also Fig. 2), and the pulley 91 mounted on the shaft 92 supported by the brackets 93, respectively, through the driving belts 94 and 95.

Figure 2:
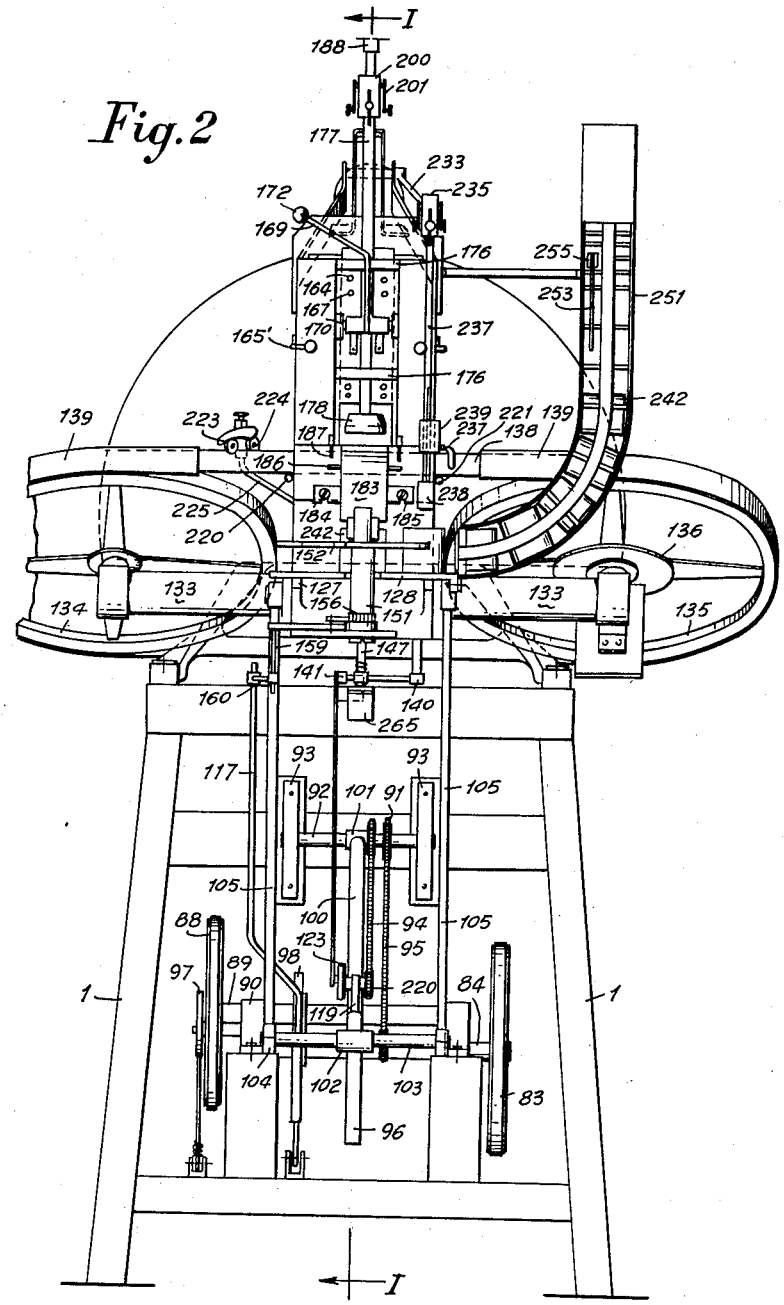

The shaft 89 has three eccentrics thereon, shown at 96, 97 and 98 respectively. On the eccentric 96 bears a follower 99 carried by a crank 100 the end 101 of which is pivoted on the axis 92; while the other end 102 is pivoted on a crosswise arranged shaft 103 at the ends of which are pivoted the lower ends 104 of two connecting rods 105 (Figs. 2 and 3). The eccentric 97 contacts the follower 106 carried by an arm 107 pivoted at 108 and having a spring 109 bearing thereon. The arm 107 has a T shape and is hinged at the point 110 to a rod 111 slidable within the guide sleeve 112 and ending in the finger member 113. Another T shaped arm 114 is pivoted at the point 115 and carries a follower 116 contacting the eccentric 98; at its other end said arm is pivoted on a rod 117 the lower end of which is connected to the machine frame by the spring 118.

A support 119 is provided on the crank 100 and in said support is journaled a stub shaft 120 which is actuated by the shaft 92 by the belt 121 and the pulley 122. A quadrangular plate 123 is mounted on the shaft 120.

The upper end 124 of the connecting rods 105 is pivoted to an element 125 fixed to the projecting pieces 126, the supports 127, the shelf 128, the slider 129 and the arms 130. The whole unit just described, which together with the associated elements will be termed the "movable head" in the following specification, is able to slide vertically on the lateral guides 131 carried by an element 132 fixed to the fore part of the gun 6 (see Fig. 3).

The projecting members 126 carry two lateral arms 133 (Figs. 2, 3 and 3A) at the ends of which are rotatably mounted pulleys 134 and 135, the latter being actuated by the electric motor by the belt 136, said motor 137 (Figs. 1 and 5) being supported by the projecting member 126 of the movable head. A continuous blade 138 is wound around the pulleys 134 and 135 and the sharp cutting edge of said blade is turned upwardly. Adjacent the pulleys 134 and 135, said blade is covered by the guards 139 (Fig. 2).

Figure 5:
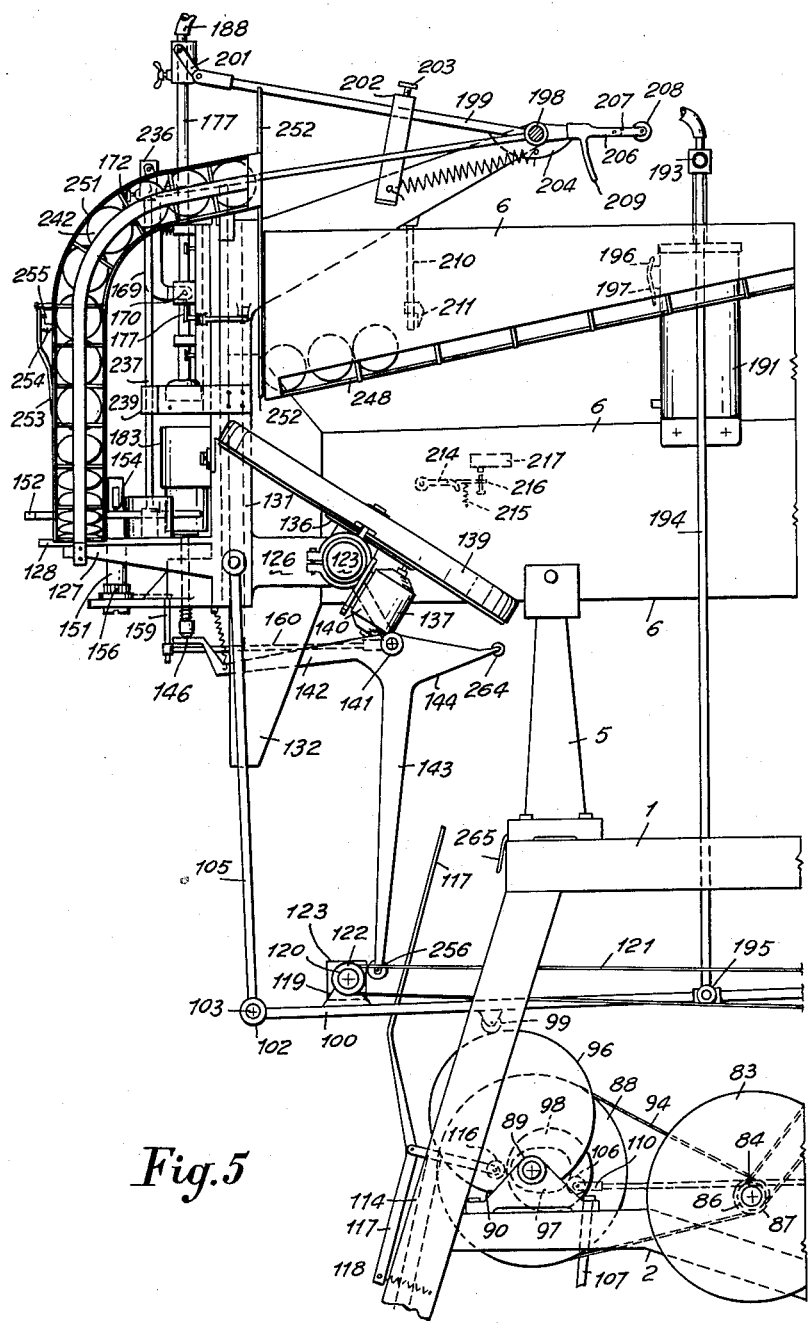
Fig. 5 is a side view of the part of the machine adjacent to the movable head, the latter being shown at the upper end of its stroke.

The movable head carries a fixed bar 140 at the lower end 141 of which is pivoted a three armed lever having arms 142, 143 and 144 (Figs. 1, 3 and 5). The arm 142 of said lever is connected to the element 125 of the movable head by the spring 145 which holds the end of said arm in contact with the rubber plug 146 carried by the stem 147 vertically slidable through the element 125 and provided at its upper end with the cap 148 able to pass through the aperture 149 provided in the shelf 128. A spring 150 is wound on the stem 147, above the plug 146. A vertical spindle 151 is rotatably mounted on the block 125 (Fig. 13) and on said spindle is fastened an indexing fixture 152 having peripheral circular recesses 153 angularly equidistantly spaced from each other, said recesses having a diameter slightly greater than that of the cans. The indexing fixture 152 is fastened to the spindle 151 by means of spring loaded balls 154 which enter the bores 155. Also on the spindle 151 is mounted a ratchet wheel 156 and thereunder is rotatably mounted the crank 157 provided with the pawl 158 engaging the ratchet wheel. To the outer end of said crank 157 is fixed the vertical rod 159 connected to the rod 160 the end of which is fork shaped at 161 (Fig. 3).

With reference to Figs. 3, 9 and 10 at a certain distance from the mouth 162 of the gun 6 is arranged a plate 163 supported by the threaded guide shanks 164 which are slidable through holes provided in the supporting back plate 165 which is fixed to the movable head by the brackets 165'. On each threaded shank 164 is wound a spring 166 having the function of spacing the plate 163 from the back plate 165. Thus, under the thrust of the meat contained within the gun 6, the plate 163 together with the associated threaded shanks 164 is apt to slide horizontally towards the back plate 165 compressing the springs 166. To limit this stroke, the plate 165 is provided with the set screws 167; the plate 163 is furthermore provided with two guide pins 180 arranged in register with the ears 168 carried by the rocker lever 169 pivoted at the point 170 with respect to the back plate 165. The rocker 169 is provided at its end with an adjustable contact screw 172 in front of a microswitch 173 wherefrom originate the leads 174 connected to the remote control switch 79 (Fig. 3'). The contact 172 of the rocker is normally held spaced from the contacts of the microswitch 173 by the spring 175 arranged between said microswitch and the back plate 165. The latter is also provided with the guides 176 through which the stem 177 may slide, said stem being internally hollow and ending at its lower end in a piston 178 having the holes 179.

The diameter of the piston is slightly less than that of the cans to be filled.

Centrally with respect to the movable head (Figs. 2, 3 and 12) under the plate 163, the continuous blade 138 slides behind the board 181 provided with the chute 182 wherefrom the cutting edge of the blade slightly projects.

Under said chute 182 is mounted the mouth piece 183 carried by the brackets 184 provided with the elongated holes 185 allowing said mouth piece to move vertically within the limits defined by the abutments 186 and 187 carried by the mouth piece and by the movable head, respectively.

The stem 177 of the piston 178 is connected at its upper end to the flexible hose 188, the remote end of which is fastened to the rigid pipe 189 fastened to the piston 190 which may slide within the cylinder 191. The upper cover of said cylinder is apertured while the lower part of the same cylinder is provided with the poppet valve 192 (Fig. 3). The rigid pipe 189 is connected to a pin 193 carried by a rod 194 pivoted at the point 195 to the crank 100 controlling the sliding movement of the movable head. To the upper end of the cylinder 191 is secured a member having the inclined planes 196 and 197.

The two lateral arms 130 of the movable head are connected by a pin 198 on which is rotatably mounted a lever 199 connected to the stem 177 by the locking threaded sleeve 200 and the links 201. Between the two arms 130 is also fastened a bridge 202 provided with the set screw 203 acting against the lever 199. The latter, at the pivot 198 is provided with a crescent shaped member 204 on which is anchored the spring 205.

Figure 6:
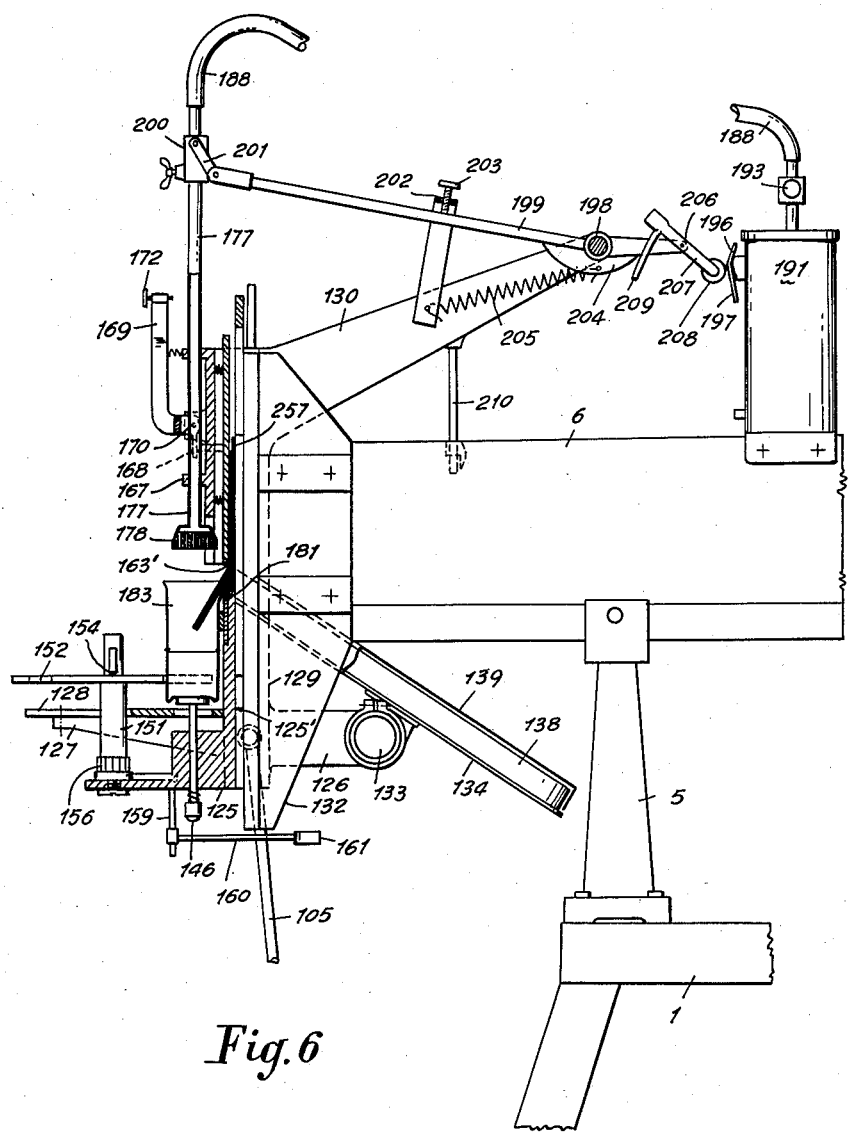
Figs. 6, 7 and 8 show partial side views at three different operative stages of the movable head.

At the end 206 of the lever 199 is pivoted the toggle lever 207 provided with the follower 208 and the counterweights 209. Said toggle lever 207 is mounted for free rotation about the pivot 206 in a clockwise direction only as seen in Figs. 3 and 6.

One of the arms 130 of the movable head (Fig. 3) has thereon a rod 210 provided with the projection 211 which lies on the vertical line passing adjacent to the follower 212 carried by a lever 213 pivoted at 214 and acted on by the spring 215. At one end, the lever 213 carries the movable contact 216 of a microswitch 217 from which originate two leads, and specifically a lead 218 connected to the switch 173 and a lead 219 connected to the remote control switch 79 (Fig. 3').

With reference to Figs. 2 and 14, the continuous blade 138 in its rectilinear run is supported by two rollers 220 and 221, while the rollers 223 and 224 carried by the arm 225 straddle the cutting edge of the blade and serve to sharpen said edge.

The roller 221 (see Fig. 14), is mounted on one end of the lever 226, pivoted at 227 and carrying at its other end the movable contact 228 which is held spaced from the switch 229 by the spring 230. In order to clean the blade (Figs. 2 and 11), the jaws 231 are kept in light contact with the blade 138 under the action of the spring 232.

On the pivot 198 carried by the arms 130 of the movable head (Figs. 1, 2 and 3) is pivoted one end of the lever 233, the other end 234 of which is fork shaped and is connected by the links 235 to the threaded block 236 fastened to the stem 237. This stem is parallel to the vertical axis of the movable head and is provided at its lower end with the cylindrical mass 238 having at its bottom a disc of malleable metal. The stem 237 is guided by the sleeve 239 carried by the head, while the lever 233 rests on the pin 240 which does not constitute a part of the movable head. Under the cylindrical mass 238 (Fig. 15) the shelf 128 is provided with a circular depression 241, with beveled edges, in which are sequentially received, in the stage prior to their being filled, the empty cans, as will be described later. The bottom 242 of the can contacts the embossing characters 243 carried by a support 244 which in turn is supported by a holder 245 comprising a knurled screw. Said screw is threadedly engaged within the threaded collar 246 provided in the lower surface of the shelf 128.

The cans 242 (Figs. 1, 2, 4 and 5) are supplied by an interchangeable container 247 arranged above the machine and having an outlet communicating with the rectilinear chute 248, protected on both sides by the guards 249. The rectilinear chute 248 is fixed to the frame of the machine to which it is fastened by the standards 250 of Fig. 1'. The stationary chute 248 has at the end thereof a curvilinear chute generally shown at 251. The curvilinear chute originates from the outlet of the stationary chute and extends to a location adjacent the shelf 128 onto which said chute feeds the cans 242 which sequentially enter the recesses of the indexing fixture 152. The curvilinear chute 251 moves with the movable head, and its inlet is provided with the baffles 252 for preventing the cans located on the stationary chute from falling from said stationary chute when the latter, due to the reciprocational movement of the movable head is out of alignment with the inlet of the movable curvilinear chute 251. A feeler 253 is mounted on said movable chute, and the end of said feeler lightly contacts the cans 242, due to the spring 254, so that should said cans not be present, the spring 254 would urge the feeler 253 against the microswitch 255, stopping the machine.

The machine operates as follows:

Let it be assumed that the machine is in the condition as shown at Fig. 3 (movable head at its lower end of stroke) and that the gun 6, as well as the loading receptacle 11 are filled with meat. Let it also be assumed that the container 247 is filled with empty cans, and that the feeding chute for the cans is filled with said cans, sequentially arranged with a can below the mouth piece 183.

The preliminary operation for starting the machine is that of energizing the motor 137 (Fig. 1), starting, driving the movement of the continuous blade 138, and of the motor 3 (Fig. 1') which actuates the hydraulic pump 64 which, under these conditions, draws oil from the reservoir 67, through the pipe 69, delivering said oil to the valve 52 which, by means of the pipe 66 causes the oil to flow again to the reservoir 67, so that the oil moves through a non-operative endless cycle. At this point, the control lever 55 is down, so as to insert the stud 56 under the tooth 57. The rotational movement of the rocker 46, due to this operation, acts through the rod 48, on the hydraulic valve 52 which delivers the pressurized oil through the tube 38 to the chamber 37, so that the thrust rod 32 starts moving forwards and the piston compresses the meat within the loading receptacle 11 and within the gun 6. The so compressed meat, also due to a slight taper of the gun 6, issues from the outlet 162 of the gun and fills the clearance existing between said outlet 162 of the gun, and the plate 163. When the pressure exerted by the meat against the plate 163 has reached a sufficient value to overcome the tension of the springs 166, the guided pins 180 carried by said plate guide the swinging movement of the rocker lever 169 and the contact between the screw 172 and the microswitch 173 which closes the circuit through the leads 174, and closes the remote control switch 79 (Fig. 3') which, through the circuits 80 and 81, starts the servomotor 71 and the motor 4. The servomotor 71, through the associated valve 70 cuts off the fluid flow towards the chamber 37 delivering said flow to the reservoir 67 through the pipe 73.

The start of the motor 4 causes the eccentrics 96, 97 and 98 to rotate simultaneously. The first mentioned eccentric, acting on the crank 100, controls the lifting movement of the movable head and therefore of the blade 138 which by its upward movement, cuts the slice of meat which is positioned between the outlet of the gun (Fig. 6) and the plate 163. The amount of meat cut at each rising stroke of the movable head is a predetermined amount and is sufficient to fill a can. The cut slice falls to pieces through the mouth piece 183 and into the can 242 located under said mouth piece, tangentially moving with respect to the bevel 163' along the lower edge of the plate 163, while the inner face 125' of the movable head holds the meat remaining within the gun 6.

Figure 7:
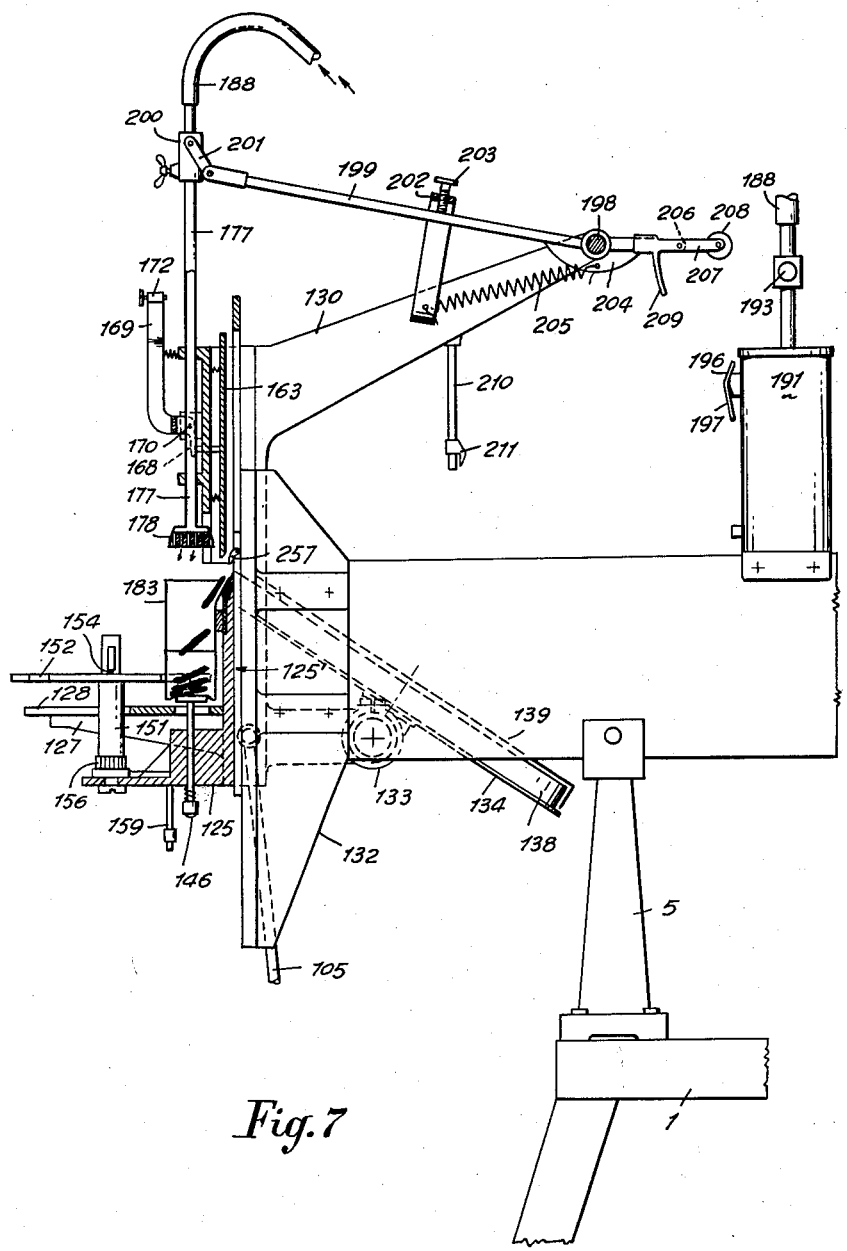
Figure 8:
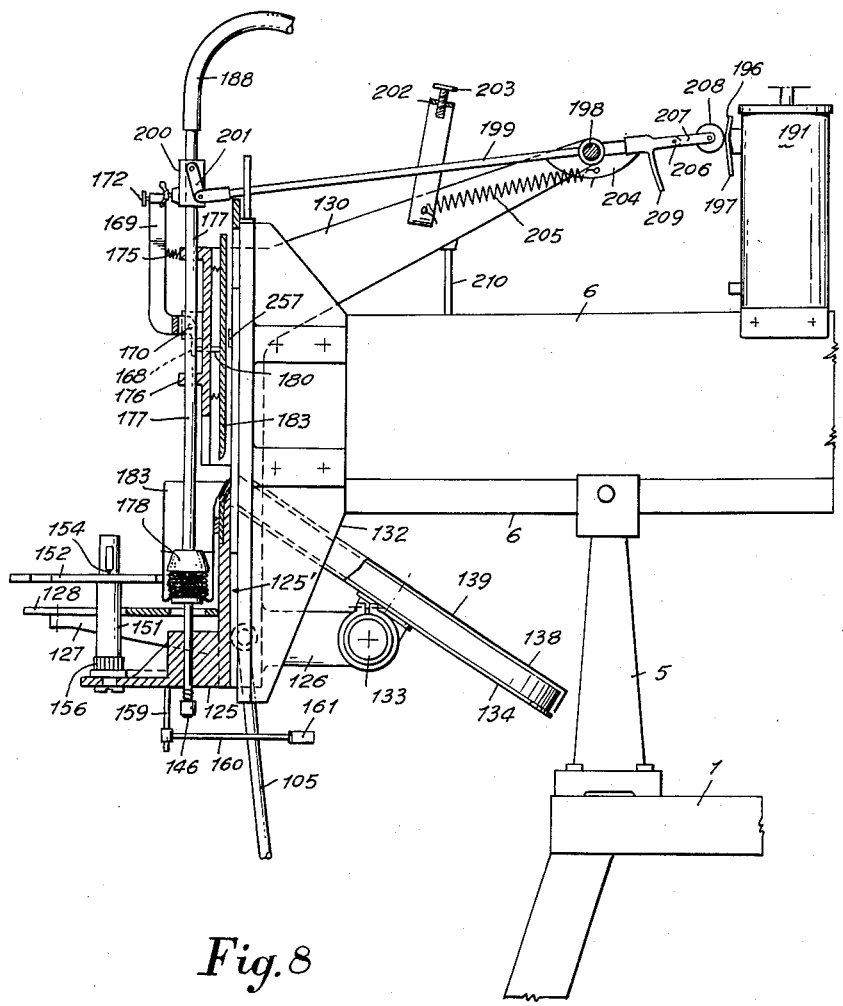

During the raising stroke of the movable head (cutting step), the follower 256 of the arm 143 of the three armed lever contacts (Fig. 5) the now rotating quadrangular plate 123; thus, the arm 142 of said lever by its upward rotation pushes the cap 148 against the bottom of the can and the latter, together with the mouth piece 183 slides upwardly until the abutments 186 and 187 come into contact (Fig. 2). During the contact step between the follower 256 and the quadrangular plate 123, due to the shape of said plate, the arm 142 imparts to both the can and the mouth piece 183 a jerk which makes the settling of the slice into the can more sure. Said jerk lasts until the movable head, in its descending movement (Fig. 3) determines the spacing away of the follower 256 from the quadrangular plate 123 due to the contact between the follower 264 of the arm 144 and the cam element 265. When the cutting action of the blade has been completed (Fig. 7) the cutting edge passes under a lug 257 preventing the meat from escaping upwardly. Now, the plate 163 is no longer urged by the meat and therefore it again moves to its initial position, whereby the rocker 169 opens the contact of the microswitch 173 and the movable head travels along its descending stroke by gravity. During the movement of the movable head (Fig. 6) upward the toggle lever 207, when impinging on the slope 197, is able to rotate clockwise, while during the downward movement, the follower 208, when impinging on the slope 196, controls the rotation of the lever 199, and causes it to be in a counterclockwise direction about the pivot 198 whereby the plunger 178 moves downward into the can 242 settling the meat contained therein. Also, during the downward movement of the movable head, the piston 190 moves downward due to the action of the rod 194, and the air, compressed by said piston passing, through the pipes 189 and 188, is blown through the holes 179 of the plunger 178, so as to cause the possible residues of meat, still adhering to said plunger, to fall into the can.

During the raising stroke of the movable head (Figs. 1 and 15), the end of the lever 233, pivoted at 198, is also raised. Since the pin 240 on which said lever rests is stationary, the stem 237 is lowered and the cylindrical mass 238, coacting with the characters 243 engraves a mark on the bottom of the empty can 242 located on the beveled depression 241 of the shelf 128, said empty can, in a subsequent step and due to the indexing movement of the indexing fixture 152 being carried under the mouth piece 183 for being filled. The indexing fixture 152 is operated as follows (Figs. 1, 2 and 3): when the foraminous plunger 178 has been raised due to the action of the spring 205 and the movable head is at the end of its downward stroke, the eccentric 98 causes the T-shaped arm 114 to rotate about its pivot 115 and the rod 117, under these conditions is inserted in the fork shaped part 161 of the rod 160 carried by the movable head. The forwards movement of said rod 117 is opposed by said contact and the spring 118 is tensioned until the rod 160 and the rod 159 are suddenly moved forward. The movement of the rod 159 causes the crank 157 to rotate through an angle which will impart to the indexing fixture 152 (Fig. 13) a rotational movement equalling the angular spacing between two recesses 153 wherein the cans are received.

Thus, the filled can is ejected from the machine, the engraved can is carried under the mouth piece, the next can is carried to the engraving station, and finally the first can issuing from the chute is received into the indexing fixture 152.

During the raising movement of the movable head (Fig. 14), should the blade meet a hard body (bone chip, foreign matter and so on), the resistance encountered by the blade 138 would cause the rotation of the lever 226, the contact 228 of which, acting on the microswitch 229 would cause the machine to be stopped, thus avoiding any damage or breakage of said blade.

Another automatic stop device for the machine operates due to lack of empty cans on the chute, as aforesaid.

During the descent step of the movable head, the projection 211 impinges the lever 213, the swinging movement of which makes the contact in the microswitch 217. The latter, through the leads 218 and 219 energizes the remote control switch 79 which in turn stops the servomotor 71, whereby the hydraulic flow is delivered again to the chamber 37 for a further forward movement of the plunger 40. Simultaneously, the remote control switch 79 controls the stop for the motor 4, which remains inoperative until, when a new thickness of meat for a slice has been formed at the outlet from the gun, the aforedescribed cycle can be repeated until the meat contained within the loading receptacle 11 has all been sliced.

When the plunger 40, during its movement into the loading receptacle 11 reaches a location near the end of its stroke, a device designed to ensure the weight uniformity of the meat sliced in connection with the last portion of said stroke, starts operating. Said device will be hereinafter described with reference to Figs. 3, 3', 3B, 3C and 4.

Figures 3B, 3C:
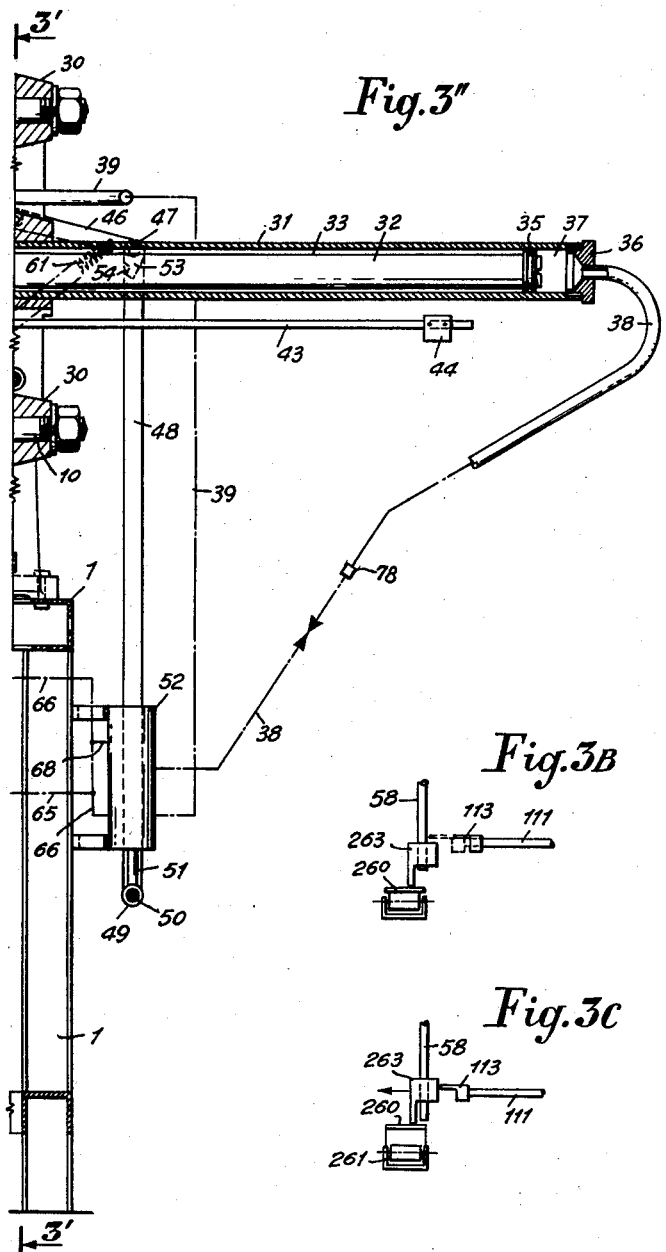
Figs. 3B and 3C show two views of a constructional detail.

Due to the action of the eccentric 97, the rod 111 reciprocates and the finger 113 moves through the path as shown in dotted lines in Fig. 3B. When the block 44, which moves together with the plunger 40 strikes the end of the crank 258, the rod 259 is lowered causing the clockwise rocking movement of the rocker 260 pivoted at 261 (Fig. 4). The end 262 of the rocker 260, by its upward movement, raises the block 263 which is freely slidable along the lower portion of the rod 58. The block 263, in its new location, intersects the path of movement of the finger 113, so that at the next forward movement of said finger, the block 263 and the rod 58 are thrust in the direction as shown in Fig. 3C.

Due to the swinging movement of the rod 58 originated by said thrust, the stud 56 becomes disengaged from the tooth 57 and the rocker 46, rotating under the action of the spring 61 depresses the rod 48 acting on the hydraulic valve 52. The latter delivers pressurized oil into the annular chamber 33 through the pipe 39 and the plunger 40 moves through its return stroke, while the oil contained within the chamber 37 is discharged through the pipe 38 into the reservoir 67.

When the plunger 40 has completed its return stroke, the loading receptacle 11' may be substituted for the loading receptacle 11, said receptacle 11' having been filled in the meantime, so that the operation can proceed through a continuous cycle. As aforesaid, the rotational movement of the loading receptacles is manually actuated, but an end of stroke switch may be provided, acting when the plunger 40 has carried out its return stroke, to automatically control the rotation of said loading receptacles.

The output of the machine, i.e, the number of the raising strokes of the movable head per time unit, depends upon the feeding rate of the hydraulic plunger of the gun and upon the temperature and the degree of compactness of the meat contained within the gun.

I claim:

1. A machine for slicing and canning food products in the plastic state, particularly meat, which comprises in combination a stationary frame, a reservoir for the meat mounted on said frame with the longitudinal axis thereof horizontal, the reservoir having a stationary portion and a portion in the form of a loading receptacle rotatable with respect to the stationary portion, said stationary portion having a fore opening at the end opposite to the rotatable portion, a first piston hydraulically movable in a direction co-axial with the said reservoir and the said receptacle portion thereof and movable into the said receptacle to compress the meat contained in the said reservoir and to convert the meat into a compact mass and to gradually expel the compact mass through the fore opening of the reservoir, a movable head mounted on the frame for vertical movement and facing the said fore opening of the reservoir, cutting means in the form of a continuous blade with the cutting edge facing up carried by the said movable head and vertically moved therewith adjacent to the said fore opening of the reservoir for cutting slices from the meat gradually shoved out of the said reservoir and projecting from the said opening in succession during the upward motion of the movable head, a mouth piece located underneath the opening of the reservoir for receiving the portion of the meat cut in the successive upward strokes of the movable head, a first motor connected to said movable head for moving said movable head upwardly, the downward movements of the movable head taking place under the effect of gravity, a container for empty cans located above the machine, an inclined chute for receiving the empty cans from the said container, said chute comprising a rectilinear portion and a curvilinear portion, the curvilinear portion being carried by the movable head, a rotating disc having equally spaced peripheral notches and pivotally mounted on the movable head, a supporting plate on said frame parallel to the said disc and receiving the cans from the said curvilinear chute, a stem vertically slidably mounted on said frame and having a die for engraving a mark on the bottom of an empty can positioned on the said supporting plate, a guide mounted on the movable head, a second piston vertically slidable along said guide, said second piston being co-axial with the said mouth piece, said second piston having a hollow stem and having a plurality of holes in the piston parallel to the said hollow stem, said second piston being for compressing a slice of meat in an empty can, means on said frame for subjecting said mouth piece and said empty can to be filled to vibration during the filling of the can, means associated with the said first piston and controlled thereby for causing the return stroke of the first piston before the first piston has wholly expelled the meat contained in the said reservoir, and means associated with the said rotating disc for bringing an empty can to be filled under said mouth piece after the said can has undergone the marking by said die and for removing the can from the said rotating disc after it is filled.

2. A machine as claimed in claim 1, wherein the said reservoir is a hollow body having a substantially rectangular cross section having the lower smaller side concave in shape, the stationary portion of the reservoir being connected to said frame, the rotatable portion being in form of a loading receptacle comprising two twin elements arranged at right angles with respect to each other each element having a cover with a handle thereon for the sealing closure of the cover, said rotatable portion being rotatable to two positions wherein it can be alternately hand loaded with the meat which has to be compressed.

3. A machine as claimed in claim 1, whereby the means to engrave a mark on the bottom of an empty can comprise a stem vertically slidable carried by the said frame, a third lever pivoted at one end to the end of the said slidable stem and at the other end to the said movable head, said third lever being arranged to lower said stem and said die during the raising of the movable head, an engraving die mounted on said plate supporting the can with which said die acts in cooperation, said plate being parallel to the rotating disc and arranged on the movable head, said supporting plate being concentric with the said engraving die and having a circular depression therein with a beveled edge, the depth of the said depression being substantially equal to the bottom shoulder of a can.

4. A machine as claimed in claim 1, which further comprises a movable plate mounted at the opening of the said reservoir, a back plate having holes therein arranged parallel to the said movable plate and carried by the said movable head, said movable plate having guiding pins which enter into the holes in the said back plate when the movable plate moves horizontally under the action of the meat compressed in the reservoir, setting screws on the said back plate for limiting the horizontal displacement of the movable plate, a rocker attached to said guiding pins, a microswitch contacted by the said rocker to energize the said first motor for starting the raising movement of the movable head.

5. A machine as claimed in claim 1, wherein the movable head has two side arms, a pulley mounted on each of the said arms, said cutting means in the form of a continuous blade being mounted on the said pulleys, said continuous blade having the cutting edge in the upper part of the blade, a third electric motor mounted on the movable head and connected to said pulleys for driving the said blade.

6. A machine as claimed in claim 5, wherein said continuous blade has a rectilinear portion extending between the said two pulleys, two rollers freely mounted on the movable head which rollers support said rectilinear portion of the blade, a first lever on said movable head operating at the striking of the blade against a hard body contained in the meat to be cut, one of the said rollers being located at the end of said lever, a microswitch operated by the said first lever for stopping of the machine, two sharpening rollers carried by said arm, an arm fastened to the movable head, the cutting edge of said blade being in contact with said sharpening rollers, and two spring urged cleaning jaws in light contact with the two faces of the said blade.

7. A machine as claimed in claim 1, wherein said curvilinear portion of the chute carried by the movable head has the upper end communicating with the rectilinear portion of the chute and the lower end which opens on the supporting plate of the movable head in register with the rotating disc, vertical baffles being interposed between the rectilinear and the curvilinear portion of the chute which hold the cans when due to the vertical movement of the movable head, the two portions of the chute do not register with each other.

8. A machine as claimed in claim 7, wherein a microswitch is arranged, in the curvilinear portion of the chute, a pin lever being provided to control the said micro-switch, said pin lever being in contact with the cans contained in the said chute, said micro-switch being arranged to stop the machine when no cans are contained in the said curvilinear chute and therefore no contact exists between the end of the said pin lever and the cans.

9. A machine as claimed in claim 1, and further comprising a first and second pulley mounted on the frame of the machine and driven by the said first motor, on a first shaft on which said first pulley is mounted, a first, a second and a third eccentric mounted on said first shaft, a first crank pivoted at one end on the said second pulley and rotated thereby and being operatively connected to the said first eccentric, a pair of connecting rods pivoted at one end on the sides of the movable head and at the other end on the other end of the said first crank, said first crank being operatively connected to the said second piston sliding vertically along the guide on the movable head, a three arm lever connected to the movable head and pivoted thereon, said three arm lever having a first arm positioned to operate on the outer bottom of an empty can when in the filling position, a second arm arranged to contact the said frame for causing the raising of the said first arm, and a third arm extending downwards and having a roller at the lower end thereof, a second shaft rotatably mounted on the said first crank near the pivoting point of the said pair of connecting rods, said second shaft having a quadrangular plate mounted thereon and being rotated by the said second pulley, the said third arm of the three arm lever coming into contact with the said rectangular plate and transmitting through the said first arm a sudden movement to a can and mouth piece during filling of the can during the raising of the movable head, a first T-shaped member having the stem extending downward and pivoted at the lower end on the frame below the said first pulley, the first arm of the said first T-shaped member having a roller which abuts against the said second eccentric and being operated thereby, the second arm of the said first T-shaped member a horizontal rod carried by the frame and slidable horizontally with respect to the frame, said horizontal rod having mounted at the free end a finger member, a second T-shaped member having the stem extended downwards and pivoted at the lower end to the said frame below the said first pulley, the first arm of the second T-shaped member being provided with a roller which abuts against said third eccentric and being moved thereby, means for operating the said hollow stem of the said second piston for raising and lowering the said second piston with which said first crank is connected, means associated with the said finger member at the free end of the said horizontal rod for operating the means associated with the said first piston which penetrates into the said loading receptacle for causing the forward stroke and the return stroke of the said first piston.

10. A machine according to claim 9, and a rod pivoted on the lower part of the frame below the said first pulley, the second arm of said second T-shaped member engaging said rod and means which operate said rotating disc to periodically rotate said rotating disc when said movable head is at the end of its downward stroke to which the upper end of said rod is operatively connected.

11. A machine as claimed in claim 9, in which the means for causing the forward movement and the return movement of the said first piston to compress the meat in the said reservoir comprise a first cylinder mounted on the frame and co-axial with the said loading receptacle, said first cylinder facing the said receptacle, a thrust rod reciprocably mounted in the said first cylinder and carrying at its fore end said first piston, said thrust rod having a plunger at its rear end slidable in said first cylinder, said plunger generating in the said first cylinder an annular chamber comprised between the outer surface of the said thrust rod and the inner surface of the said first cylinder and a cylindrical chamber between the bottom of the said first cylinder and the rear face of the said plunger, a tank for fluid mounted on the said frame and containing oil, a first pipe between the said oil containing tank and said cylindrical chamber, a second pipe between said oil containing tank and said annular chamber, a first hydraulic valve in said first and second pipes, a pump associated with the said oil tank for drawing oil therefrom and supplying said oil to the said cylindrical and annular chamber, a second motor operating said hydraulic pump, a second hydraulic valve between the said oil tank hydraulically and said pump, a servomotor mounted on the frame for controlling the said second hydraulic valve, a remote control switch connected to the said first motor and to said servomotor for energizing said servomotor, said remote control switch being responsive to the motion of the said movable head, a rod and block device connected to the said first piston and moving horizontally therewith, a second crank pivoted on the frame below the fore part of the said first cylinder and having a free end, a first rod pivoted at the said free end and extending downwards, said first rod being arranged to lower when impinged by the said block in its forwards movement, a second control rod pivoted on the said frame near the fore part of the said first cylinder and operatively connected at its lower end to the lower end of the said first rod, a rocker fixed at the base of the frame and operatively connecting the lower part of the said second control rod to the lower part of the said first rod, a third rod controlled by the said first hydraulic valve for controlling the flow of the oil from the said oil tank to the said cylindrical chamber and to the said annular chamber, said rocker being arranged to be periodically operated by the said finger member mounted at the end of the said horizontal rod moved by the said second eccentric.

12. A machine as claimed in claim 11, wherein the means which operatively connect said first crank to the said hollow stem of the said second piston sliding along a guide carried by the movable head, comprises a fourth rod articulated on the said first crank and directed upwards, said fourth rod having at its upper end a third piston, a second cylinder in which said third piston is vertically slidable to compress air in the said second cylinder, a second lever connected to the upper end of the said hollow stem and having a toggle on the free end thereof abutting against the outer surface of the said second cylinder to cause the lowering of the said hollow stem and of the said second piston connected thereto during the lowering of the movable head, whereby a slice of meat is compressed by the said second piston in an empty can, said second piston having a plurality of holes parallel to the said hollow stem, piping means to which said hollow stem is connected to receive compressed air from the said second cylinder and convey the said compressed air to the said plurality of holes made in the said second piston.

References Cited in the file of this patent

UNITED STATES PATENTS

| | | |
|---|---|---|
| 2,044,813 | Rooney | June 23, 1936 |
| 2,195,173 | Jackson | Mar. 26, 1940 |
| 2,209,824 | Louisot | July 30, 1940 |
| 2,541,907 | Appling | Feb. 13, 1951 |
| 2,631,528 | Wood | Mar. 17, 1953 |
| 2,634,893 | Polk | Apr. 14, 1953 |
| 2,720,737 | Vogt | Oct. 18, 1955 |